United States Patent [19]

Clark

[11] 3,982,074

[45] Sept. 21, 1976

[54] AUTOMATIC CHANNEL ASSIGNMENT CIRCUIT

[75] Inventor: James Monroe Clark, Cedar Grove, N.J.

[73] Assignee: International Telephone and Telegraph Corporation, Nutley, N.J.

[22] Filed: Apr. 21, 1975

[21] Appl. No.: 570,057

[52] U.S. Cl. ........................... 179/15 BV; 179/15 BS
[51] Int. Cl.² .......................................... H04J 3/06
[58] Field of Search .......... 179/15 A, 15 BA, 15 BS, 179/15 BV, 15 BW, 15 AF; 178/69.5

[56] References Cited
UNITED STATES PATENTS

| | | | |
|---|---|---|---|
| 3,742,145 | 6/1973 | Clark | 179/15 BA |
| 3,798,378 | 3/1974 | Epstein | 179/15 BS |

*Primary Examiner*—William C. Cooper
*Assistant Examiner*—Joseph A. Popek
*Attorney, Agent, or Firm*—John T. O'Halloran; Alfred C. Hill

[57] ABSTRACT

An automatic channel assignment circuit in a controlling association with an asynchronous or synchronous digital time division multiplexer and demultiplexer combination at one communication terminal to assign channels of transmitted and received synchronous data streams to asynchronous or synchronous source data signals in a manner to minimize temporary data memory regardless of the number of different bit rates of the source data signals by assigning the data signals to channels of the associated one of the transmitted and received data streams so that the bits of each of the data signals tend to have equal spacing throughout the bits of the associated one of the transmitted and received data streams. Each of the transmitted and received data streams have a predetermined fixed data format with respect to the channels and a given bit rate greater than the total of the bit rates of the source signals. However, the automatic channel assignment circuit provides, in effect, an automatically determined-at-the-time-of-rate-selection a variable data format with respect to the ports. The channel assignment control circuit also includes a means to automatically indicate when the total of the mixture of bit rates has exceeded an allowable maximum.

22 Claims, 11 Drawing Figures

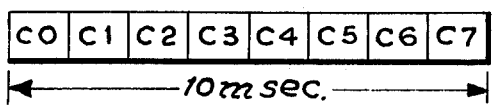
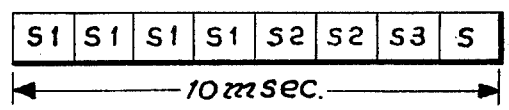
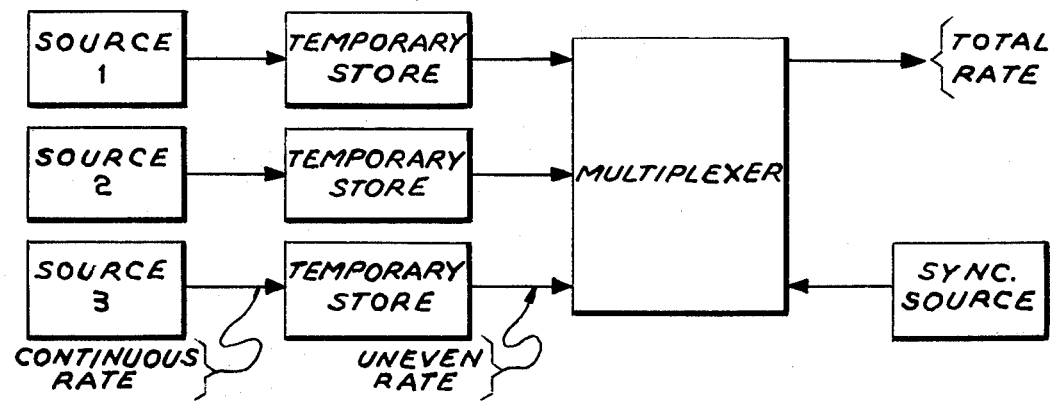
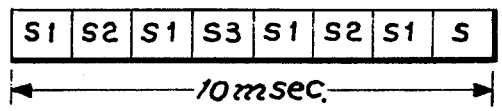
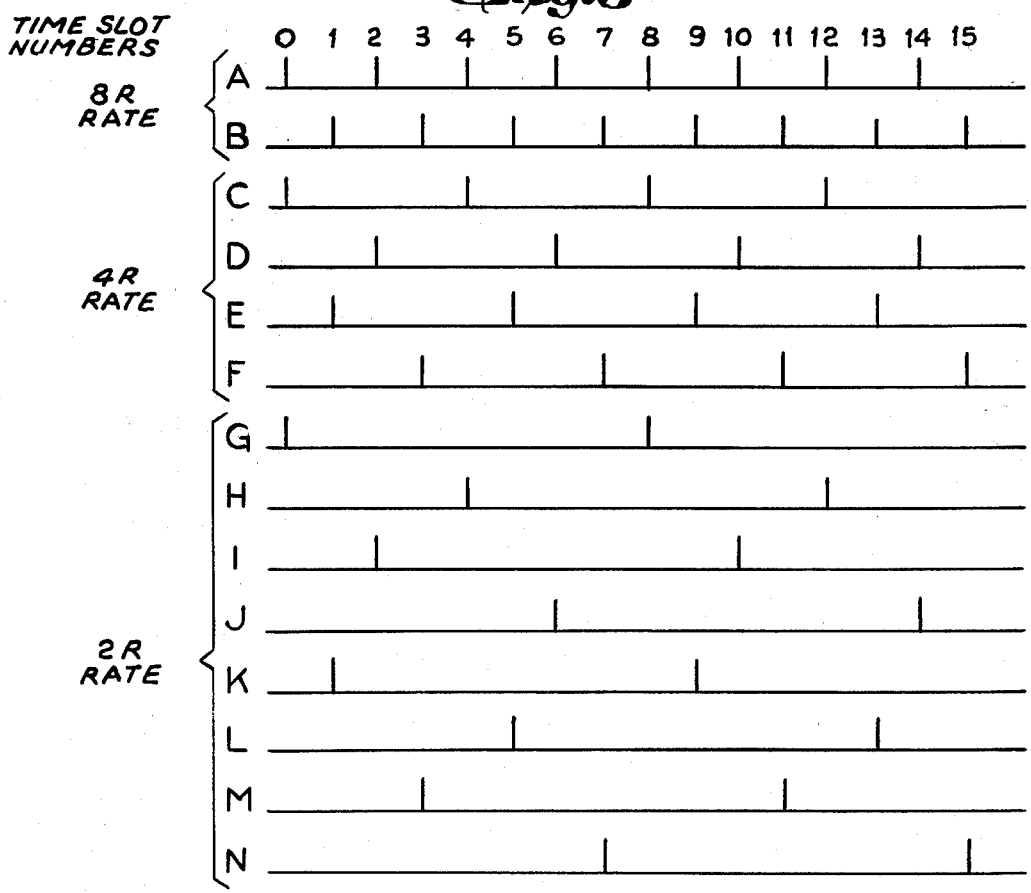

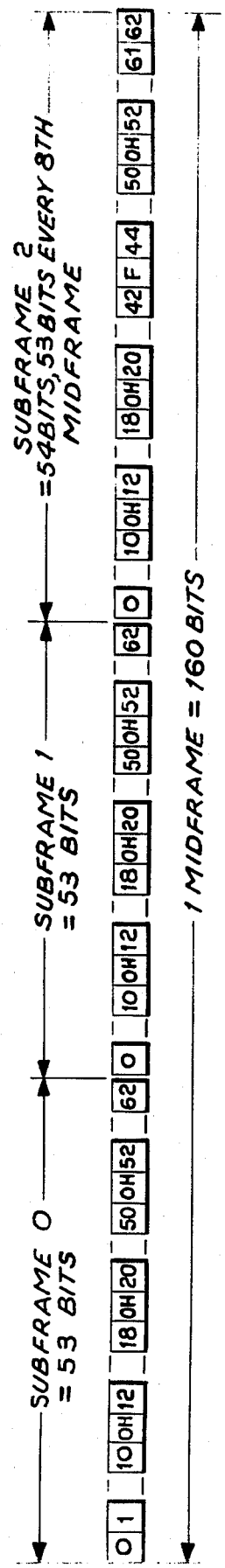

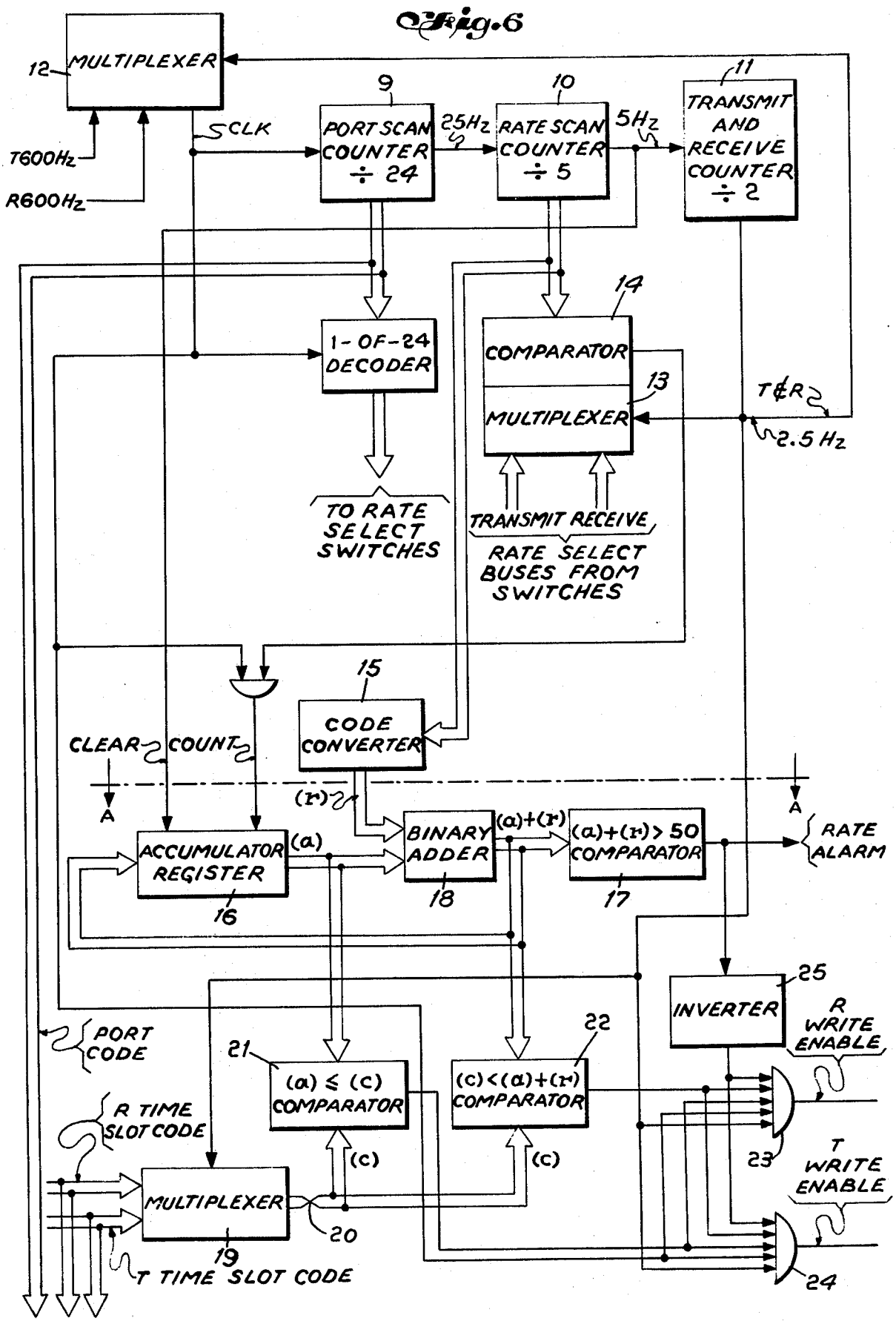

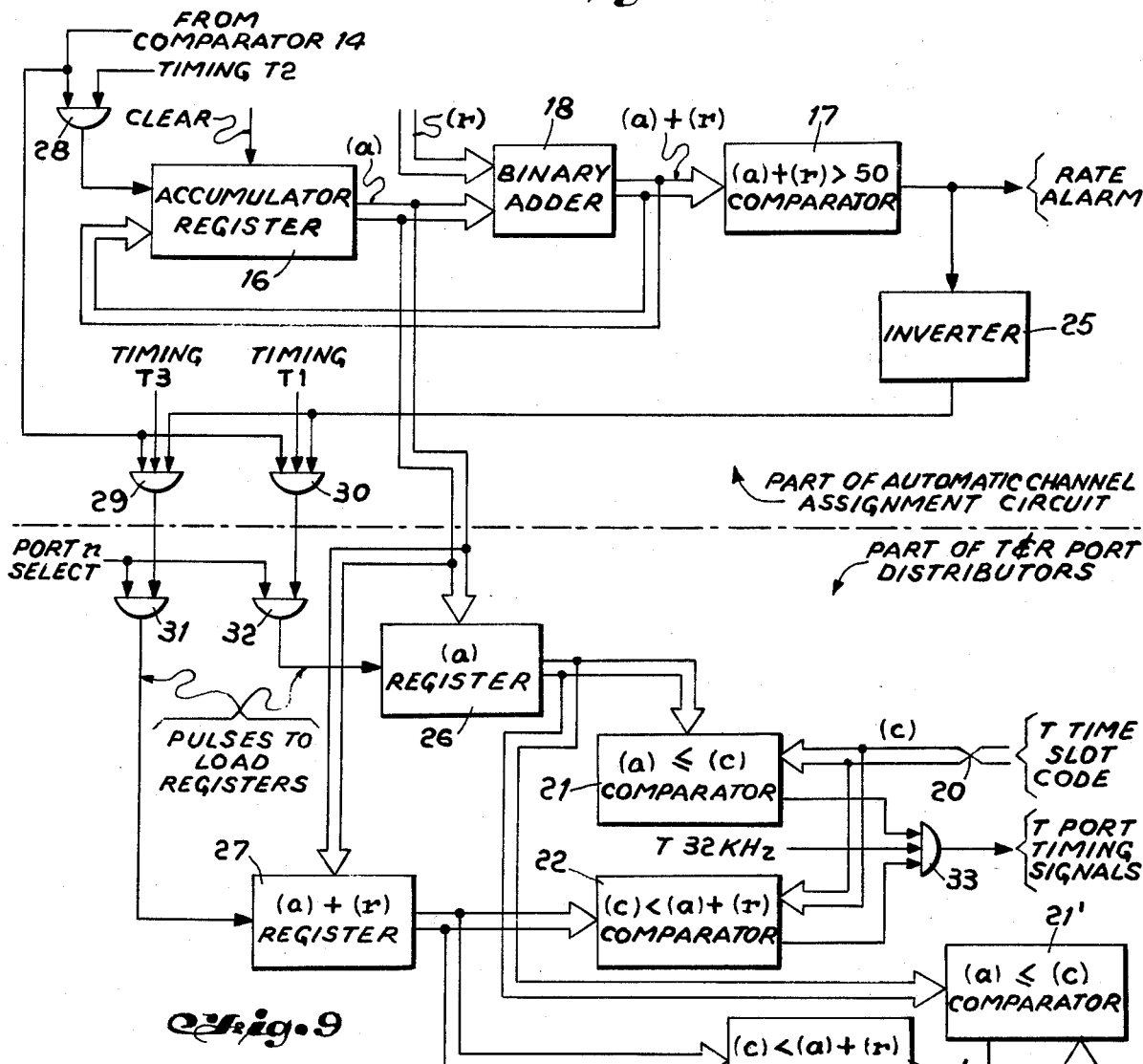
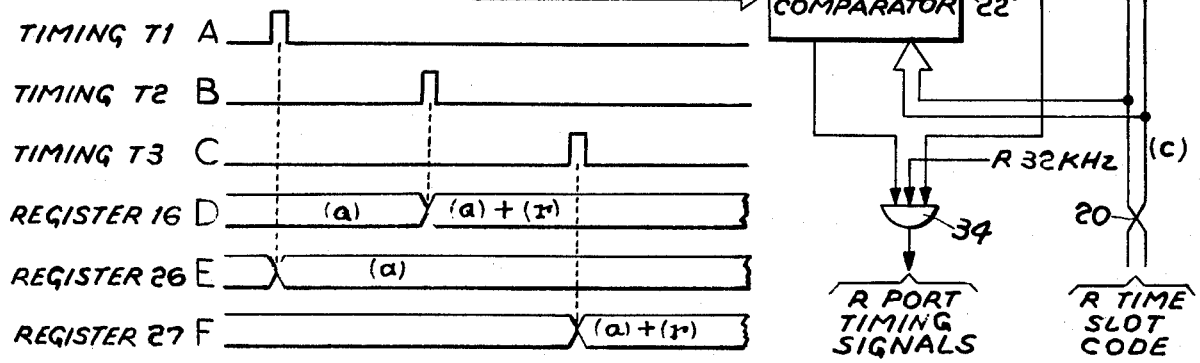

AUTOMATIC CHANNEL ASSIGNMENT CIRCUIT

BACKGROUND OF THE INVENTION

This invention relates to digital time division multiplex (TDM) communication systems and more particularly to an automatic channel assignment circuit in a controlling association with an asynchronous or synchronous TDM multiplexer and demultiplexer employed at one communication terminal of a digital communication system.

To avoid confusion, asynchronous or synchronous data input source signals to be multiplexed and output signals having been demultiplexed will be referred to herein as transmit and receive "port" signals, and basic time slots in a synchronous multiplexed data stream format are referred to herein as "channels".

SUMMARY OF THE INVENTION

An object of the present invention is to provide an automatic channel assignment circuit in a controlling association with an asynchronous or synchronous digital TDM multiplexer and demultiplexer at one communication terminal of a digital communication system which provides nearly equal spacing of bits of each source data rate in a synchronous data stream for any mixture of source data rates up to a maximum total rate with a minimum of temporary storage facilities.

Another object of the present invention is to provide an automatic channel assignment circuit in a controlling association with an asynchronous or synchronous digital TDM multiplexer and demultiplexer at one communication terminal of a digital communication system which provides nearly equal spacing of bits of each port data rate in a synchronous data stream for any mixture of port data rates up to a maximum total rate when the required port rates are $2^n$ multiples of a basic synchronous channel rate with a minimum of temporary storage facilities.

A feature of the present invention is the provision of an automatic channel assignment circuit in a controlling association with an asynchronous or synchronous digital time division multiplex multiplexer and dumultiplexer at one communication terminal to control the multiplexing of N transmit port signals having a first mixture of different bit rates into a transmitted synchronous data stream having a predetermined fixed data format and a given bit rate greater than the total rate of the first mixture of different bit rates and to control the demultiplexing of N receive port signals having a second mixture of different bit rates from a received synchronous data stream having the same data format and the given bit rate, where N is an integer greater than one, comprising: a first source of a first timing code identifying transmit time slots of the transmitted data stream; a second source of a second timing code identifying receive time slots of the transmitted data stream; and a circuit arrangement coupled to the first and second sources and responding in a given manner to the first and second timing codes to produce at least one transmit control signal and at least one receive control signal to control distribution of bits of each of the transmit port signals with equal spacing throughout the transmit time slots and to control extraction of bits of each of the receive port signals from the received data stream, the bits of each of the receive port signals being distributed with equal spacing throughout the receive time slots, the distribution of the bits of each of the transmit and receive port signals throughout the transmit and receive time slots being in agreement with its associated bit rate.

In the case that the first and second mixtures are different, the circuit arrangement coupled to the first and second sources will respond sequentially to both timing codes.

In the case that the first and second mixtures are identical, the circuit arrangement coupled to the first and second sources can respond simultaneously to both timing codes instead of sequentially.

BRIEF DESCRIPTION OF THE DRAWINGS

Above-mentioned and other features and objects of this invention will become more apparent by reference to the following description taken in conjunction with the accompanying drawing, in which:

FIG. 1A illustrates a typical synchronous data stream format;

FIG. 1B illustrates a typical distribution of bits from three different data sources each having a different bit rate in the format of FIG. 1A according to prior art techniques;

FIG. 1C is a block diagram of the circuitry necessary to distribute bits from three different data sources each having a different bit rate in accordance with the prior art illustrated in FIG. 1B;

FIG. 2 illustrates the distribution of the bits from three different data sources each having a different bit rate in the format of FIG. 1A in accordance with the principles of the present invention;

FIG. 3 illustrates a set of curves defining the synchronous data stream time slot assignment for various port rates;

FIG. 4 illustrates a 32 KBS (kilobits per second) data format employed in the implementation of FIG. 6 in accordance with the principles of the present invention;

FIG. 5 illustrates the overhead format for the data format of FIG. 4;

FIG. 6 is a block diagram of one embodiment of the automatic channel assignment circuit in accordance with the principles of the present invention;

FIG. 7 is a set of curves illustrating how the circuit of FIG. 6 is synchronized;

FIG. 8 is a block diagram of another embodiment of the automatic channel assignment circuit in accordance with the principles of the present invention which is implemented by a modification of FIG. 6 below line A—A thereof; and FIG. 9 is a timing diagram illustrating the operation of the embodiment of FIG. 8.

DESCRIPTION OF THE PREFERRED EMBODIMENT

The following will be a description of the basic problem of providing suitable circuits permitting a mixture of rates for a multiplexer and demultiplexer combination and the basic solution to such a problem.

Suppose three data sources having continuous rates of 400, 200 and 100 BPS (bits per second) are to be multiplexed into a synchronous data stream format with 100 bits per second allowed for synchronization. A synchronous data stream format defining eight channels C0 - C7 of 100 BPS each as shown in FIG. 1A can be used.

Four channels of the format of FIG. 1A can be used for the 400 BPS source S1, two channels for the 200

BPS source S2, one channel for the 100 BPS source S3 and a synchronization channel S. If consecutive channels of the format of FIG. 1A are assigned to the sources, the format shown in FIG. 1B results.

The format of FIG. 1B is not good, because, for example, the source S1 bits are sent at twice the average rate during the first half of the 10 millisecond (msec.) frame, and none are sent during the second half of the frame. This requires temporary storage of bits in temporary stores 4, 5 and 6 prior to multiplexing in multiplexer 7 under control of synchronous source 8 as shown in FIG. 1C because the source rate is continuous: that is, the source bits are equally spaced.

The storage provided by temporary stores 4, 5 and 6 can be minimized by using instead the distribution of bits of the sources S1, S2 and S3 as shown in FIG. 2. In accordance with FIG. 2, for every source, the bits assigned to that source are equally spaced and, therefore, transmitted continuously.

While the data format of FIG. 2 is typical of the format employed in this invention, it is also a typical prior art format provided that the mix of rates is known at the time of design and built into the logic circuitry. The prior art may even provide a few different rate mixes selectable by a switch. But no known prior art arrangements have been capable of providing any mix of rates (typically, millions of combinations are possible) as can be done with the automatic channel assignment circuit of this invention, where the mix of rates is selected at the time the equipment is set-up for operation, not before it is designed.

Each of the transmitted and received data streams have a predetermined fixed data format with respect to the channels. However, the automatic channel assignment circuit of the present invention provides, in effect, an automatically determined-at-the-time-of-rate-selection a variable data format with respect to the ports.

A problem solved by the present invention is to provide an automatic channel assignment circuit in a controlling association with a multiplexer to enable the multiplexer to combine up to N source data signals into one synchronous data output stream. A source data signal may have any of the data rates R, 2R, 4R, 8R ... $2^n R$, and the output channel rate of the synchronous data output stream is $2^m R$. The rate kR is allowed for "overhead", that is, other functions such as synchronization, and any combination of source rates is allowed as long as the total rate of all sources does not exceed $(2^m - k)R$. In accordance with the principles of this invention, a general technique is provided for assigning channels of the synchronous data stream that will minimize the requirement for temporary data memory or storage regardless of the combination of source rates. The automatic channel assignment circuit of this invention automatically adapts a suitable data format according to the foregoing techniques when for each source, a switch is set to indicate the selected rate.

Also, the automatic channel assignment circuit of this invention provides a means to automatically indicate when the total of the selected rates has exceeded the allowable maximum rate.

Another problem solved by the subject invention is similar to the foregoing problem, but the source rates are $k_1 R$, $k_2 R$, $k_3 R$ ... $k_N R$ and the output channel rate is KR, where the constants $k_2$ ... $k_N$ and $K$ are integers, but not necessarily powers of two. In this case, more temporary data storage facilities are required, but the storage facilities with respect to the prior art storage facilities can still be minimized. (Bit spacing is nearly, but not necessarily exactly equalized.)

The same techniques discussed above are also applicable to time division switching of ports with mixed rates.

The following is a description of the principle concepts of the present invention. For purposes of illustration, the values $R = 100$, $n = 3$ ($2^n = 8$), $m = 4$ ($2^m = 16$), $k = 1$ and $N = 5$ will be used in the following description.

For a frame of $2^m = 16$ bits, the bit position or time slots are conveniently numbered 0–15, and these time slots can be identified by the states of an m-bit binary counter counting from 0000 to 1111 (0 to 15 in decimal).

The channel numbers that correspond to the time slot numbers will now be defined in a way that will be shown to be very useful. For any time slot, the corresponding channel number is obtained by writing the time slot number in binary notation backwards, obtaining the channel number in binary notation. That is, the least significant bit of the channel number is also the most significant bit of the time slot number and vice vera. The same process can also be used to convert a channel number to a time slot number. This is illustrated in the following Table I.

TABLE I

| time slot number | | channel number | |
|---|---|---|---|
| decimal | binary | binary | decimal |
| 0 | 0000 | 0000 | 0 |
| 1 | 0001 | 1000 | 8 |
| 2 | 0010 | 0100 | 4 |
| 3 | 0011 | 1100 | 12 |
| 4 | 0100 | 0010 | 2 |
| 5 | 0101 | 1010 | 10 |
| 6 | 0110 | 0110 | 6 |
| 7 | 0111 | 1110 | 14 |
| 8 | 1000 | 0001 | 1 |
| 9 | 1001 | 1001 | 9 |
| 10 | 1010 | 0101 | 5 |
| 11 | 1011 | 1101 | 13 |
| 12 | 1100 | 0011 | 3 |
| 13 | 1101 | 1011 | 11 |
| 14 | 1110 | 0111 | 7 |
| 15 | 1111 | 1111 | 15 |

For example, time slot 11 corresponds to channel 13, and time slot 13 corresponds to channel 11.

If the channel numbers are taken in order as shown in the following Table II,

TABLE II

| channel numbers: | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 8R port assignments: | ←——A——→ | | | | | | | | ←——B——→ | | | | | | | |
| 4R port assignments: | ←—C—→ | | | | ←—D—→ | | | | ←—E—→ | | | | ←—F—→ | | | |

TABLE II-continued

| 2R port assignments: | G | | H | | I | | J | | K | | L | | M | | N | |
|---|---|---|---|---|---|---|---|---|---|---|---|---|---|---|---|---|
| R port assignments: | 0 | 1 | 2 | 3 | 4 | 5 | 6 | 7 | 8 | 9 | 10 | 11 | 12 | 13 | 14 | 15 | and the channel numbers are partitioned in half, in quarters, in eighths, etc., as shown in Table II, suitable port assignments will be made. Channels 0–7 (assignment A) or channels 8–15 (assignment B) are each suitable assignments for a port requiring the rate 8R, that is, a port requiring eight channels. By reference to Tables I and II, it will be seen that assignment A includes all the even-numbered time slots and assignment B includes all the odd-numbered time slots. In each case, the time slots are equally spaced in time as shown in FIG. 3 which shows the time slot numbers in sequence.

By dividing assignment A into two parts, assignments C and D suitable for a rate of 4R are created as shown in Table II. Table II and FIG. 3 show how the assignments are repeatedly divided in half until assignments of one channel (or one time slot) per port are obtained.

To obtain suitable assignments when specific port rates are selected, such as shown in Table III,

TABLE III

| port: | 1 | 2 | 3 | 4 | 5 |
|---|---|---|---|---|---|
| rate: | R | 4R | R | 8R | R | the ports are first sorted by rates so that the higher rate ports can be assigned channels before the lower rate ports as illustrated in Table IV.

TABLE IV

| port: | 4 | 2 | (none) | 1 | 3 | 5 |
|---|---|---|---|---|---|---|
| rate: | 8R | 4R | 2R | R | R | R |

The sequence of ports 1, 3 and 5 is arbitrary because they have the same rate. The channels are then assigned in order as illustrated in Table V.

TABLE V

| channel numbers: | 0 | 7 | 8 | 11 | 12 | 13 | 14 |
|---|---|---|---|---|---|---|---|
| assignment: | ← A → | | ← E → | | 12 | 13 | 14 |
| port: | 4 | | 2 | | 1 | 3 | 5 |
| rate: | 8R | | 4R | | R | R | R |

Channel 15 is left for overhead functions.

It may be convenient to use a binary coding of each port assignment which is compact (few bits) and easy to interpret. If an X is used to indicate a "don't care" condition, the channel numbers and time slot numbers corresponding to assignments A–N may be represented as shown in Table VI.

TABLE VI

| assignment | channel | time slot | assignment code |
|---|---|---|---|
| A | 0XXX | XXX0 | 00010 |
| B | 1XXX | XXX1 | 00011 |
| C | 00XX | XX00 | 00100 |
| D | 01XX | XX10 | 00110 |
| E | 10XX | XX01 | 00101 |
| F | 11XX | XX11 | 00111 |
| G | 000X | X000 | 01000 |
| H | 001X | X100 | 01100 |
| I | 010X | X010 | 01010 |
| J | 011X | X110 | 01110 |
| K | 100X | X001 | 01001 |

TABLE VI-continued

| assignment | channel | time slot | assignment code |
|---|---|---|---|
| L | 101X | X101 | 01101 |
| M | 110X | X011 | 01011 |
| N | 111X | X111 | 01111 |
| 0 | 0000 | 0000 | 10000 |
| 1 | 0001 | 1000 | 11000 |
| etc. | etc. | etc. | etc. |
| 15 | 1111 | 1111 | 11111 |

The time slot representation is not binary, since a digit may be either 0, 1, or X; but a binary assignment code can be formed by replacing each string of X's with an equal number of binary zeros followed by a binary one. That is, XXX of a time slot specification is replaced by 0001; XX of a time slot specification is replaced by 001; X of a time slot specification is replaced by 01; and 1 is added at the left if no X is in a time slot specification. Assignment code 00000 can be used to indicate no assignment (idle port). Interpretation is easy, for example, code 00101 has two leading zeros, therefore, the time slot specification is XX followed by the bits 01 following the left-most 1 bit, namely XX01. By replacing the XX by all possible binary combinations of two bits, all of the time slots belonging to this assignment can be listed as indicated in Table VII.

TABLE VII

| E | XX01 |
|---|---|
| 1 | 0001 |
| 5 | 0101 |
| 9 | 1001 |
| 13 | 1101 |

It should be noted that the time slot assignments of Table VII agree with the assignment E of FIG. 3.

Suppose the total (output) synchronous bit rate is an interger multiple of R, but not of the form $2^m R$. For example, 13R, instead of 16R as in the previous examples. In this case, the last three channels 13, 14 and 15 are deleted. These channels correspond to time slots 11, 7 and 15, which will not exist if the timing counter is made to skip counts 7, 11 and 15. This causes some format jitter, always less than one cycle, peak-to-peak, because the time slots are not perfectly equally spaced.

Suppose that the port rates are integer multiples of R, but not of the form $2^n R$. For port rate pR, p consecutive channel numbers can be assigned, as before. This will correspond to nearly equally-spaced time slots, but the spacing will not be perfect, leading to more jitter. Nevertheless, jitter will be minimal compared to other schemes such as in the prior art arrangements mentioned hereinabove.

In multiplexing applications, the demultiplexer at a remote terminal must use the same assignments as the multiplexer at a local terminal to which it is linked by a communications link. The same rate selection information must be available at both the linked multiplexer and demultiplexer either by prior arrangement, or by order-wire coordination or by sending the information on a nearly error-free control channel. Also, any arbitrary choices of assignment must be made by the same arbitrary rule by both the linked multiplexer and demultiplexer. It is convenient to assign channels to ports requiring the same rate by increasing port number and increasing channel number.

Time division switching with mixed rates is achieved by pairing a multiplexer and demultiplexer with different assignments. This is illustrated in Table VIII.

TABLE VIII

| multiplexer ports: | 4 | 2 | 6 | 1 | 3 | 7 | 5 |
|---|---|---|---|---|---|---|---|
| multiplexer channels: | 0–3 | 4–7 | 8 9 | 10 11 | 12 13 | 14 | 15 |
| demultiplexer channels: | 0–3 | 4–7 | 8 9 | 10 11 | 12 13 | 14 | 15 |
| demultiplexer ports: | 5 | 1 | 3 | 7 | 2 | 4 | 6 |

It will be noted from Table VIII that multiplexer port 4 is connected to demultiplexer port 5, etc. Thus, the channel assignments for input ports are made as described hereinabove, but each time a channel assignment A(M) is given to an input port M, give the same channel assignment A(M) to the output port C(M). But, if the rate of the switch of input port M does not match the rate of the switch of output port C(M), raise an alarm signal.

A combination of switching and multiplexing with mixed rates can also be achieved as is illustrated in Table IX.

TABLE IX

| multiplexer ports: | 2 | | 3 | | 5 | | 1 | | 4 | 6 |
|---|---|---|---|---|---|---|---|---|---|---|
| multiplexer channels: | 0–7 | | 8 | 9 | 10 | 11 | 12 | 13 | 14 | 15 |
| demultiplexer channels: | 0–3 | 4–7 | | 8–11 | | | 12 | 13 | 14 | 15 |
| demultiplexer ports: | 1 | 5 | | 2 | | | 3 | | 6 | 4 |

As can be seen from Table IX, multiplexer ports 3 and 5 are multiplexed into demultiplexer port 2 and multiplexer port 2 is demultiplexed into output ports 1 and 5.

The remainder of the description will be directed to an implementation of the above described port assignment technique.

FIG. 4 illustrates a 32 KBS synchronous data stream format suitable for a 24-port asynchronous multiplexer/demultiplexer. The overhead channel occupies time slots 11, 19 and 51 of each subframe. The channel allocations of the data stream format are based on the coding of channels and time slots as shown in Table X.

| Time Slot LSB MSB Channel MSBLSB ABCDEF | Channel Number | Time Slot Number | |
|---|---|---|---|
| 000000 | 0 | 0 | |
| 000001 | 1 | 32 | |
| 000010 | 2 | 16 | |
| 000011 | 3 | 48 | |
| 000100 | 4 | 8 | |
| 000101 | 5 | 40 | |
| 000110 | 6 | 24 | |
| 000111 | 7 | 56 | |
| 001000 | 8 | 4 | |
| 001001 | 9 | 36 | |
| 001010 | 10 | 20 | |
| 001011 | 11 | 52 | |
| 001100 | 12 | 12 | |
| 001101 | 13 | 44 | |
| 001110 | 14 | 28 | |
| 001111 | 15 | 60 | |
| 010000 | 16 | 2 | |
| 010001 | 17 | 34 | |
| 010010 | 18 | 18 | |
| 010011 | 19 | 50 | |
| 010100 | 20 | 10 | |
| 010101 | 21 | 42 | |
| 010110 | 22 | 26 | |
| 010111 | 23 | 58 | |
| 011000 | 24 | 6 | AVAILABLE FOR DATA |
| 011001 | 25 | 38 | |
| 011010 | 26 | 22 | |
| 011011 | 27 | 54 | |
| 011100 | 28 | 14 | |
| 011101 | 29 | 46 | |
| 011110 | 30 | 30 | |
| 011111 | 31 | 62 | |
| 100000 | 32 | 1 | |
| 100001 | 33 | 33 | |
| 100010 | 34 | 17 | |
| 100011 | 35 | 49 | |
| 100100 | 36 | 9 | |
| 100101 | 37 | 41 | |
| 100110 | 38 | 25 | |
| 100111 | 39 | 57 | |
| 101000 | 40 | 5 | |
| 101001 | 41 | 37 | |
| 101010 | 42 | 21 | |
| 101011 | 43 | 53 | |
| 101100 | 44 | 13 | |
| 101101 | 45 | 45 | |
| 101110 | 46 | 29 | |
| 101111 | 47 | 61 | |

| Time Slot LSB MSB Channel MSBLSB ABCDEF | Channel Number | Time Slot Number | | |
|---|---|---|---|---|
| 110000 | 48 | 3 | | |
| 110001 | 49 | 35 | | |
| 110010 | 50 | 19 | | |
| 110011 | 51 | 51 | OVERHEAD (3) | |
| 110100 | 52 | 11 | | |
| 110101 | 53 | 43 | SPARE - 1/3 | NOT USED - 2/3 |
| 110110 | 54 | 27 | | |
| 110111 | 55 | 59 | | |
| 111000 | 56 | 7 | | |
| 111001 | 57 | 39 | | |
| 111010 | 58 | 23 | NOT USED (10) | |
| 111011 | 59 | 55 | | |
| 111100 | 60 | 15 | | |
| 111101 | 61 | 47 | | |
| 111110 | 62 | 31 | | |
| 111111 | 63 | 63 | | |

Channel number 0–49 are available for assignment to 24 ports, as needed. Channels 50, 51 and 52 are permanently assigned to the overhead channel. Channel numbers 54–63 are not used. Channel number 53 is used only for about every third midframe, to obtain division of the 32 KBS synchronous data stream rate to the desired channel data rate. The channel numbers are made to correspond to time slots (and vice versa) by representing them in binary notation and reversing the binary numbers such that the most significant bit (MSB) of a channel number is also the least significant bit (LSB) of the corresponding time slot number, and vice versa. The time slot numbers refer to the sequence of the data in each subframe and the channel numbers refer to the sequence by which the time slots (or channels) are assigned.

There are three subframes per midframe, and 64 midframes per multiframe as shown in FIG. 4. The third subframe in each midframe has 54 bit periods, except for midframes numbered 7, 15, 23, 27, 31, 39, 47, 55, 59 and 63 (midframes are numbered 0–63). All other subframes have 53 bit periods. The subframe length is varied by skipping time slot 43 as required. This adjusts the data rate of each data channel to 600.46912 BPS.

FIG. 5 illustrates two overhead data formats. Each of these formats includes the short sync code 01 with the "don't stuff command" including the midframe number, while the "stuff command" includes the complement of the midframe number (The midframe number is six bits in binary notation).

The overhead data words are employed to send the short sync code and long sync code together with a stuff and don't stuff command. Complete multiframe sync is easily achieved in less than 80 msec. by combining a short sync code and a long sync code that allows multiframe sync to be obtained in much less than the multiframe period (320 msec.). Three subframes, containing one overhead word, is called a midframe. A six bit counter that counts 64 midframes per multiframe is synchronized (to obtain bit count integrity) by sending the six bit count each midframe. For stuff control coding, a 1 bit is sent and the complement of the six bit count is sent to indicate a stuff action.

For example, consider the count 000101 (binary 5) and its complement 111010. If the port assigned to time slot five will not stuff next, then a 0 bit and the count is sent and will appear as 0000101. If the port will stuff next, then a 1 bit and complemented count is sent, namely, 1111010. To obtain the count for purposes of sync, the first bit is EXCLUSIVE-OR-ED with the next six bits, obtaining 000101, (the count) in both cases. To detect the stuff control message, correcting as many as three bit errors, the count is EXCLUSIVE-OR-ED with the last six bits, obtaining 0000000 in the first case, and 1111111 in the second case. A majority vote of the seven bits corrects up to three bit errors in each code. The above seven bit code is thus a combined long sync code and stuff control code. One such seven bit code and one two bit short sync code make one nine bit overhead word, one of which occupies each midframe.

Referring to FIG. 6, there is illustrated a block diagram of an automatic channel assignment circuit in accordance with the principles of the present invention including a port scan counter 9, a rate scan counter 10 and a transmit-receiver counter 11, counting down from a 600 Hz basic clock. Counter 11 allocates half of the counting cycle to the transmit circuits and half to the receive circuits (200 msec. each) where the transmit and the receive rate mixtures are different. The output of counter 11 causes the input of counter 4 to be switched from a 600 Hz transmit clock to a 600 Hz receive clock in multiplexer 12. Where the transmit and the receive rate mixtures are identical, counter 11 and multiplexer 12 may be eliminated with counters 9 and 10 being driven from any convenient clock source, provided that the alternate scheme of FIGS. 8 and 9 is used. In this arrangement synchronization is not required.

However, with the implementation shown in FIG. 6, synchronization of counters 9, 10 and 11 in the transmit and receive mode is necessary and is accomplished by employing extra states of the counters as illustrated in FIG. 7. The port scan counter 9 (Curve A, FIG. 7) generally counts through states corresponding to ports 1 through 24, the rate scan counter 10 (Curve B, FIG. 7) generally counts through counts corresponding to rates 9600, 4800, 2400, 1200 and 600 BPS and the transmit and receive counter 11 (Curve C, FIG. 7) counts between transmit and receive states. However, before and after each change of counter 11, as shown in Curve A, FIG. 7 (and only at these times) the extra states B, S and R are used between states 24 and 1 of the counter 9. The purpose of these extra states are:

B (Blank) — Write "blank" codes in the port timing distributor memory for unassigned time slots or channels as discussed below.

S (Sync) — Wait for the first clock pulse of the newly selected clock. For example, if counter 11 switched from RCV (receive) to XMT (transmit), wait for the first XMT clock pulse. Since a RCV clock pulse caused the switch to XMT timing, and since XMT and RCV timing are asynchronous, the wait may be from zero to one full clock period, that is, there is not always sufficient time to ensure doing anything useful, therefore, wait for start of a complete clock period.

R (Reset) — Reset accumulator 16 to zero. This is represented by the CLEAR input to accumulator 16.

Counter 9 as illustrated in FIG. 6, can have a division factor of 24, but may have a division factor of 27 depending on the counting state of counter 10.

In each half of the total counting cycle, counter 10 counts through five states representing the port bit rates in descending order 9600, 4800, 2400, 1200 and 600 BPS. Multiplexer 13 selects the transmit or receive rate select bus as determined by the state of counter 11. The rate select code is changed to 1200 BPS if it is TTY, (otherwise, the rate select code is not changed) and is then compared in comparator 14 with the rate code from counter 10. Matching codes indicate that the rate select switch presently scanned by counter 9 is selecting the same rate as selected by counter 10. The result of the comparison in comparator 14 is used to enable the assignment of time slots for that rate select switch. Counters 9 and 10 are arranged so that assignments are made in the following order;

all 9600 BPS transmit ports
all 4800 BPS transmit ports
all 2400 BPS transmit port
all 1200 BPS transmit ports
all 600 BPS transmit ports
9600 BPS receive ports
all 4800 BPS receive ports
all 2400 BPS receive ports
all 1200 BPS receive ports
all 600 BPS receive ports where 1200 BPS in the above list includes the TTY mode. Within each of the above listed groups, the ports are given assignments in order of the port numbers (1 to 24, coded 0 to 23 in binary code, for example).

Code converter 15 converts the rate select code to a binary number (r) giving the number of channels per port. Accumulator register 16 is reset to zero at the beginning of each half of the total counting cycle by the 5 Hz output of counter 10. For the remainder of the half cycle, register 16 maintains a count of the total number of channels assigned thus far. At a typical point in the assignment cycle, (a) channels have been assigned; namely channels 0 through (a) −1 and (r) more channels are to be assigned next; namely, channels (a) through (a) + (r) − 1. The channels are assigned as needed from 0 through 50. If (a) + (r) is greater than 50, comparator 17 enables a rate alarm. The signal (a) + (r) is obtained by binary adder 18 connected to the outputs of converter 15 and register 16.

A channel (c) is among those channels to be assigned next if it satisfies the inequalities (a) (c) and (c) < (a) + (r). Depending on which half cycle is active, the transmit or receive time slot code is gated through multiplexer 19 as shown and reversed (re-name the bits in reverse order, or reverse the wiring connection such as at 20), thus converting the time slot code to a channel code labeled (c). Comparators 21 and 22 test for the above two inequalities. If both inequalities are satisfied, and there is no rate alarm, a binary 1 appears at the output of inverter 25 and a write enable pulse to the appropriate transmit and receive port timing distributor is generated in AND gates 23 and 24 during the time slot corresponding to the channel being assigned. The write enable causes the port code to be written into a memory of either the transmit or receive port timing distributors. If the assignment differs from the port code previously stored, the port code presently being read from the memory of either the transmit or receive port timing distributors and being decoded to produce the port timing pulses, will be replaced by a new port code. Thus, the memories of the transmit and receive port timing distributors are "slaved to", or "refreshed by" the rate information which is mechanically stored by the transmit and receive rate select switches.

At the end of each half-cycle, less than 50 channels might be assigned (the total rate of the port may be less than 30 KBS). Although not shown on the block diagram, a pause must be generated at this point during which blank port codes are written into the memory of either the transmit or receive port timing distributors for channels satisfying only the inequality (a) (c). These "blank" port codes include the numbers 24 through 31 in binary code which do not correspond to actual ports. The 1-of-24 decoders of the transmit and receive port distributors do not produce pulses for blank port codes and since blank port codes are stored for channel numbers exceeding 50 (overhead and fill channels), no port timing pulses can be generated during the overhead or fill time slots.

The embodiment of the automatic channel assignment circuit of this invention just described is incorporated in a controlling association with a multiplexer and demultiplexer of one terminal of a digital communications system as disclosed in the copending application of J. M. Clark, S. B. Cohen and A. H. Magnus, Ser. No. 565,905, filed Apr. 7, 1975, whose disclosure is incorporated herein by reference.

Referring to FIGS. 8 and 9, an alternative embodiment of FIG. 6 is disclosed. This alternative embodiment is actually a modification of the embodiment of FIG. 6 below line A—A. The output signal from comparator 14 is coupled through AND gate 28 at T2 timing to an input of accumulator register 16. Accumulator register 16, binary adder 18 and comparator 17 operate as described above with respect to FIG. 6.

As disclosed in the above cited copending application, the transmit and receive port timing distributors are used to hold and interpret assignment information provided by the binary numbers (a) and (a) + (r). (The port timing distributors are shared in common by all ports.)

However, in accordance with the modification of FIG. 8, the assignment information numbers are transferred to registers 26 and 27 under control of AND gates 29–30. Registers 26 and 27, associated gates 31, 32 and comparators 21, 22, 21' and 22' are now present in each port circuit, where registers 26 and 27 of each port hold only the assignment information for the associated port. The output numbers of register 26 are coupled to comparators 21 and 21' in the transmit port distributor and the output numbers of register 27 are coupled to comparators 22 and 22' in the receive port distributor. The transmit time slot codes are coupled to comparators 21 and 22 and the receive time slot codes are coupled to comparators 21' and 22'. Comparators 21 and 22 and AND gate 33 interpret the assignment numbers coupled thereto and generate the transmit port timing signals while comparators 21' and 22' and AND gate 34 interpret the assignment number coupled thereto and generate the receive port timing signals. T32 KHz and R32 KHz are clocks for the transmit and receive multiplexed bit rates, respectively.

While I have described above the principles of my invention in connection with specific apparatus it is to be clearly understood that this description is made only by way of example and not as a limitation to the scope of my invention as set forth in the objects thereof and in the accompanying claims.

I claim:

1. An automatic channel assignment circuit coupled to a digital time division multiplex multiplexer and demultiplexer at one communication terminal to control the multiplexing of N transmit port signals having a first mixture of different bit rates into a transmitted synchronous data stream having a predetermined fixed data format and a given bit rate greater than the total rate of said first mixture of different bit rates and to control the demultiplexing of N receive port signals having a second mixture of different bit rates from a received synchronous data stream having said data format and said given bit rate, where N is an integer greater than one, comprising:

a first source of a first timing code identifying transmit time slots of said transmitted data stream;

a second source of a second timing code identifying receive time slots of said transmitted data streams; and a circuit arrangement coupled to said first and second sources and to each of said multiplexer and said demultiplexer, said circuit arrangement responding to said first and second timing codes to produce at least one transmit control signal for coupling to said multiplexer and at least one receive control signal for coupling to said demultiplexer, said transmit control signal controlling the distribution of bits of each of said transmit port signals with equal spacing throughout said transmit time slots and said receive control signal controlling the extraction of bits of each of said receive port signals from said received data stream, said bits of each of said receive port signals being distributed with equal spacing throughout said receive time slots, said distribution of said bits of each of said transmit and receive port signals throughout said transmit and receive time slots being in agreement with its associated bit rate.

2. An automatic channel assignment circuit according to claim 1, wherein said circuit arrangement includes a third source of a transmit clock to control said circuit arrangement during a transmit portion of a cycle of operation of said circuit arrangement, a fourth source of a receive clock to control said circuit arrangement during a receive portion of said cycle of operation of said circuit arrangement, a first counter to generate port codes for said transmit and receive port signals, a second counter coupled in series with said first counter to generate rate codes for said transmit and receive port signals, a third counter coupled in series with said second counter to define said transmit portion and said receive portion, said third counter connecting said third source to said first counter during said transmit portion and said fourth source to said first counter during said receive portion, a first multiplexer coupled to said third counter, a transmit rate bus and a receive rate bus, a first comparator coupled to said second counter and said first multiplexer to compare said rate codes sequentially with a transmit rate on said transmit rate bus and a receive rate on said receive rate bus to produce a first control signal for each of said transmit portion and said receive portion, a code converter coupled to said second counter to convert each of said rate codes to a first binary number representing the number of channels per port to be assigned, said first binary number being provided in each of said transmit and receive portions, an accumulator register coupled to a selected one of said third and fourth sources and said first comparator, said register being responsive to said first control signal to provide in each of said transmit and receive portions a second binary number representing the number of assigned channels, a binary adder coupled to said register and said code converter to add said first and second binary numbers to provide a third binary number in each of said transmit and receive portions, said binary adder coupling said third binary number to an input of said register, a second multiplexer coupled to said first and second sources on said third counter, said second multiplexer responding to said first and second timing codes to provide a fourth binary number in each of said transmit and receive portions, said fourth binary number representing the number of channels to be assigned, a second comparator coupled to said register and said second multiplexer to provide a second control signal when said second binary number is equal to or less than said fourth binary number, a third comparator coupled to said adder and said second multiplexer to provide a third control signal when said fourth binary number is less than said third binary number, a fourth comparator coupled to said adder to provide a rate alarm signal when said third binary number is greater than the maximum number of channels capable of being assigned to ports, an inverter coupled to said fourth compartor to invert said rate alarm signal, a first AND gate coupled to said inverter, said second and third comparators, said third counter and said third source to produce said transmit control signal in said transmit portion in response to said transmit clock, a transmit output of said third counter and said second and third control signals, and a second AND gate coupled to said inverter, said second and third comparators, said third counter and said fourth source to produce said receive control signal in said receive portion in response to said receive clock, a receive output of said third counter and said second and third control signals.

3. An automatic channel assignment circuit according to claim 2, wherein
said multiplexer and said demultiplexer are synchronous.

4. An automatic channel assignment circuit according to claim 2, wherein
said multiplexer and said demultiplexer are asynchronous.

5. An automatic channel assignment circuit according to claim 2, wherein
said transmit and receive port signals are synchronous.

6. An automatic channel assignment circuit according to claim 2, wherein
said transmit and receive port signals are asynchronous.

7. An automatic channel assignment circuit according to claim 2, wherein
said transmit control signal is a transmit write enable signal, and
said receive control signal is a receive write enable signal.

8. An automatic channel assignment circuit according to claim 2, wherein
said first and second mixtures are different, and
said circuit arrangement responds sequentially to said first and second timing codes.

9. An automatic channel assignment circuit according to claim 2, wherein
said first and second mixtures are identical, and
said circuit arrangement responds simultaneously to said first and second timing codes.

10. An automatic channel assignment circuit according to claim 1, wherein
said multiplexer and said demultiplexer are synchronous.

11. An automatic channel assignment circuit according to claim 1, wherein
said multiplexer and said demultiplexer are asynchronous.

12. An automatic channel assignment circuit according to claim 1, wherein
said transmit and receive port signals are synchronous.

13. An automatic channel assignment circuit according to claim 1, wherein
said transmit and receive port signals are asynchronous.

14. An automatic channel assignment circuit according to claim 1, wherein
said first and second mixtures are different, and
said circuit arrangement responds sequentially to said first and second timing codes.

15. An automatic channel assignment circuit according to claim 1, wherein
said first and second mixtures are identical, and
said circuit arrangement reponds simultaneously to said first and second timing codes.

16. An automatic channel assignment circuit according to claim 1, wherein
said transmit control signal is a transmit write enable signal, and
said receive control signal is a receive write enable signal.

17. An automatic channel assignment circuit according to claim 1, wherein
said transmit control signal is a plurality of transmit port timing signals, and
said receive control signal is a plurality of receive port timing signals.

18. An automatic channel assignment circuit according to claim 1, wherein said circuit arrangement includes
a third source of a transmit clock to control said circuit arrangement during a transmit portion of a cycle of operation of said circuit arrangement,
a fourth source of a receive clock to control said circuit arrangement during a receive portion of said cycle of operation of said circuit arrangement,
a first counter to generate port codes for said transmit and receive port signals,
a second counter coupled in series with said first counter to generate rate codes for said transmit and receive port signals,
a third counter coupled in series with said second counter to define said transmit portion and said receive portion, said third counter connecting said third source to said first counter during said transmit portion and said fourth source to said first counter during said receive portion,
a multiplexer coupled to said third counter, a transmit rate bus and a receive rate bus,
a first comparator coupled to said second counter and said multiplexer to compare said rate codes sequentially with a transmit rate on said transmit rate bus and a receive rate on said receive rate bus to produce a first control signal for each of said transmit portion and said receive portion,
a code converter coupled to said second counter to convert each of said rate codes to a first binary number representing the number of channels per port to be assigned, said first binary number being provided in each of said transmit and receive portions,
an accumulator register coupled to said first comparator, said accumulator register being responsive to said first control signal to provide in each of said transmit and receive portions a second binary number representing the number of assigned channels,
a binary adder coupled to said accumulator register and said coder converter to add said first and second binary numbers to provide a third binary number in each of said transmit and receive portions, said binary adder coupling said third binary number to an input of said accumulator register,
a second comparator coupled to said adder to provide a rate alarm signal when said third binary number is greater than the maximum number of channels capable of being assigned to ports,
an inverter coupled to said second comparator to invert said rate alarm signal,
a first register coupled to said inverter, said accumulator register and said first comparator to store said second binary number under control of said first control signal and said inverted rate alarm signal
a second register coupled to said inverter, said accumulator register and said first comparator to store said third binary number under control of said first control signal and said inverted rate alarm signal,
a third comparator coupled to said first register and said first source to provide a second control signal when said second binary number is equal to or less than said first timing code,
a fourth comparator coupled to said first register and said first source to provide a third control signal when said first timing code is less than said second binary number, a fifth comparator coupled to said second register and said second source to provide a fourth control signal when said third binary number is equal to or less than said second timing code, a sixth comparator coupled to said second register and said second source to provide a fifth control signal when said second timing code is less than said third binary number, a first AND gate coupled to said third source, and said third and fourth comparators, to produce said transmit control signal in said transmit portion in response to said transmit clock, and said second and third control signals, and a second AND gate coupled to said fourth source, and said fifth and sixth comparators to produce said receive control signal in said receive portion in response to said receive clock and said fourth and fifth control signals.

19. An automatic channel assignment circuit according to claim 18, wherein
said multiplexer and said demultiplexer are synchronous.

20. An automatic channel assignment circuit according to claim 18, wherein
said multiplexer and said demultiplexer are asynchronous.

21. An automatic channel assignment circuit according to claim 18, wherein
said transmit and receive port signals are synchronous.

22. An automatic channel assignment circuit according to claim 18, wherein
said transmit and receive port signals are asynchronous.

* * * * *